US012572535B2

(12) United States Patent
Xuan et al.

(10) Patent No.: US 12,572,535 B2
(45) Date of Patent: Mar. 10, 2026

(54) NATURAL LANGUAGE DATABASE INTERFACE

(71) Applicant: Omnissa, LLC, Mountain View, CA (US)

(72) Inventors: Chaoting Xuan, Atlanta, GA (US); Ravish Chawla, Chamblee, GA (US); Erich Stuntebeck, Johns Greek, GA (US)

(73) Assignee: Omnissa, LLC, Mountain View, CA (US)

( * ) Notice: Subject to any disclaimer, the term of this patent is extended or adjusted under 35 U.S.C. 154(b) by 210 days.

(21) Appl. No.: 18/301,739

(22) Filed: Apr. 17, 2023

(65) Prior Publication Data

US 2024/0346021 A1     Oct. 17, 2024

(51) Int. Cl.
*G06F 16/2452* (2019.01)
*G06F 40/20* (2020.01)

(52) U.S. Cl.
CPC ........ *G06F 16/24522* (2019.01); *G06F 40/20* (2020.01)

(58) Field of Classification Search
CPC ........................... G06F 16/24522; G06F 40/20
See application file for complete search history.

(56) References Cited

U.S. PATENT DOCUMENTS

| | | | | |
|---|---|---|---|---|
| 2018/0137090 A1* | 5/2018 | Duan | ..................... | G06F 40/30 |
| 2019/0340466 A1* | 11/2019 | Berseth | ................... | G06F 18/40 |
| 2021/0081799 A1* | 3/2021 | Johnson | ................ | G06F 40/205 |
| 2022/0300754 A1* | 9/2022 | Biswas | .................. | G06N 3/082 |
| 2024/0061834 A1* | 2/2024 | Tangari | ............. | G06F 16/24522 |
| 2024/0184829 A1* | 6/2024 | Roy | ...................... | G06F 16/243 |

OTHER PUBLICATIONS

Li et al., "What Do You Mean by That?" A Parser-Independent Interactive Approach for Enhancing Text-to-Sql, 2020, arXiv, whole document (Year: 2020).*
Zhong et al., Grounded Adaptation for Zero-shot Executable Semantic Parsing, 2021, arXiv, whole document (Year: 2021).*

* cited by examiner

*Primary Examiner* — Sonia L Gay
(74) *Attorney, Agent, or Firm* — Kim & Stewart LLP

(57) ABSTRACT

The present disclosure provides an approach for training a machine learning model. Embodiments include receiving text comprising a natural language request. Embodiments include providing one or more inputs to a source machine learning model based on the text, wherein the source machine learning model has been trained using source training data corresponding to a plurality of databases. Embodiments include receiving, from the source machine learning model in response to the one or more inputs, a database query in a syntax corresponding to a target database. Embodiments include generating training data for a target machine learning model based on the text and the database query received from the source machine learning model, wherein the target machine learning model has been trained using a smaller amount of training data than the source training data that was used to train the source machine learning model.

20 Claims, 4 Drawing Sheets

100

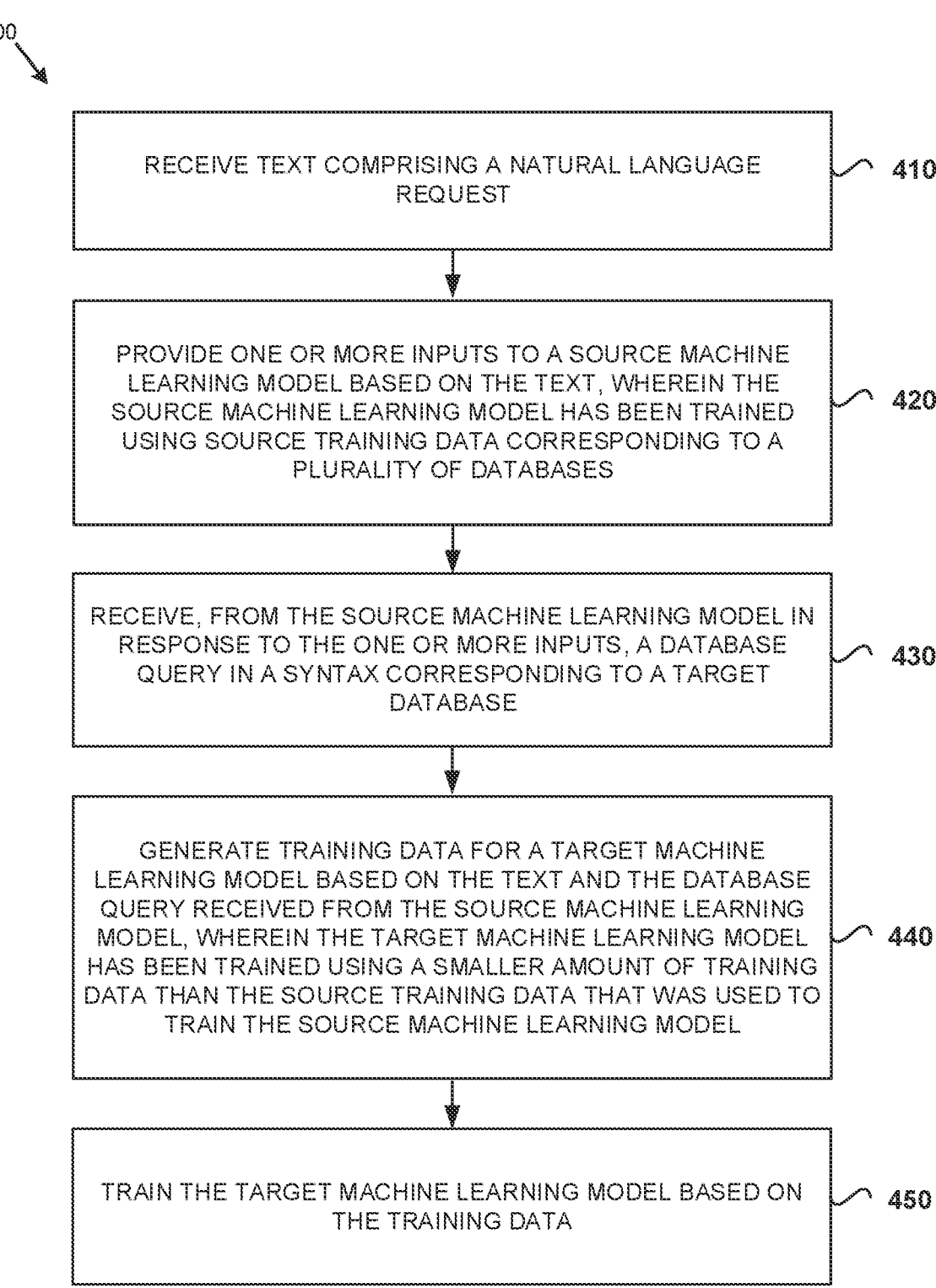

400

RECEIVE TEXT COMPRISING A NATURAL LANGUAGE REQUEST ⟋ 410

PROVIDE ONE OR MORE INPUTS TO A SOURCE MACHINE LEARNING MODEL BASED ON THE TEXT, WHEREIN THE SOURCE MACHINE LEARNING MODEL HAS BEEN TRAINED USING SOURCE TRAINING DATA CORRESPONDING TO A PLURALITY OF DATABASES ⟋ 420

RECEIVE, FROM THE SOURCE MACHINE LEARNING MODEL IN RESPONSE TO THE ONE OR MORE INPUTS, A DATABASE QUERY IN A SYNTAX CORRESPONDING TO A TARGET DATABASE ⟋ 430

GENERATE TRAINING DATA FOR A TARGET MACHINE LEARNING MODEL BASED ON THE TEXT AND THE DATABASE QUERY RECEIVED FROM THE SOURCE MACHINE LEARNING MODEL, WHEREIN THE TARGET MACHINE LEARNING MODEL HAS BEEN TRAINED USING A SMALLER AMOUNT OF TRAINING DATA THAN THE SOURCE TRAINING DATA THAT WAS USED TO TRAIN THE SOURCE MACHINE LEARNING MODEL ⟋ 440

TRAIN THE TARGET MACHINE LEARNING MODEL BASED ON THE TRAINING DATA ⟋ 450

FIG. 4

NATURAL LANGUAGE DATABASE INTERFACE

BACKGROUND

Software applications store large amounts of data, such as information related to customers and products. For example, software applications may store data in databases, and this data may be accessed via user interfaces, such as including "dashboard" views or reports. In some cases, users may request particular data via user interfaces, and the requested data may be retrieved from databases. However, conventional techniques generally involve template-based dashboards and reports where users are limited in their ability to request data according to the limitations of the templates that are used. For example, a template may only allow a user to select certain options and/or may otherwise restrict the types of input that the user can provide. Furthermore, the databases used to store data associated with software applications may require particular types of syntax in order to retrieve stored data, and many users may not be knowledgeable with regards to these types of syntax. As such, existing techniques do not allow a user to extract the full value from the potentially large amounts of data stored in association with a software application.

What is needed are improved techniques for enabling users to access data that is stored in databases associated with software applications.

BRIEF DESCRIPTION OF THE DRAWINGS

FIG. 4 depicts example operations related to training a machine learning model for improved data retrieval according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
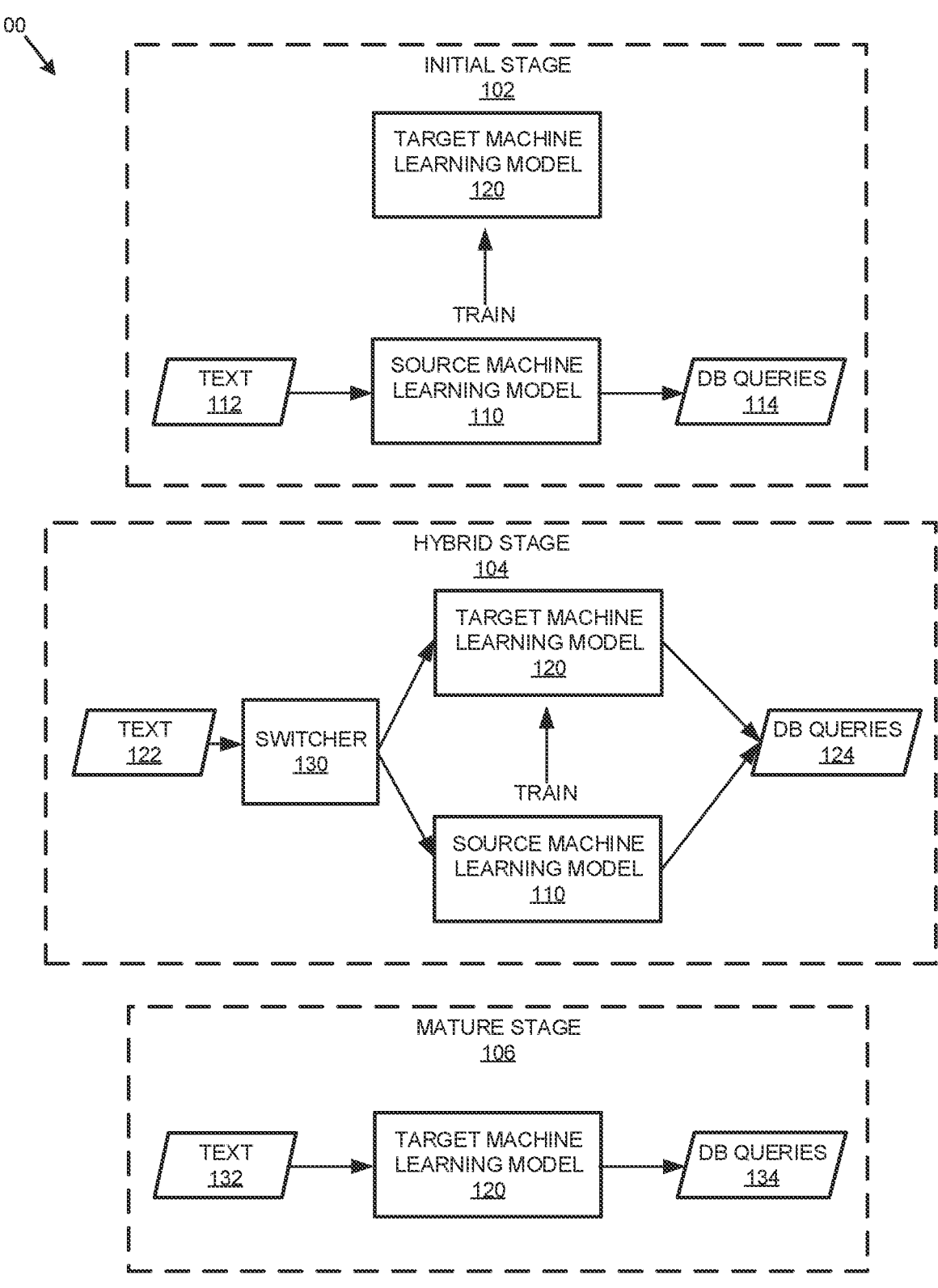
FIG. 1 is a block diagram of example stages related to training a machine learning model for improved data retrieval according to embodiments of the present disclosure.

The present disclosure provides an approach for training a machine learning model for improved data retrieval. In particular, one or more machine learning models may be trained to translate natural language queries (e.g., provided by a user via text or voice) into database queries having a syntax applicable to a particular database.

In certain embodiments, a source machine learning model is used as a "teacher" model in order to train a target machine learning model (e.g., a "student" model). For example, the source machine learning model may be a large machine learning model that has been pre-trained with a large training data set that is not specific to a target domain in which the target machine learning model is to be used and/or the source machine learning model may be provided by a third-party. In certain embodiments, the source machine learning model is a "black box" in which the underlying logic of the machine learning model is not available, and so the source machine learning model may not provide explainable or auditable results. Thus, by training a target machine learning model based on the source machine learning model, techniques described herein allow the benefits of a large third-party machine learning model to be gained (e.g., avoiding the need for large amounts of training data to be generated specifically for the target machine learning model) while also producing a model that is more focused on the target domain, that is more resource-efficient (e.g., that utilizes fewer physical computing resources as a result of being smaller), and/or for which the internal logic is accessible, such as for explainability and auditing purposes.

In some embodiments, as described in more detail below with respect to FIG. 1, a target machine learning model is trained through a series of stages. In an initial stage, text inputs (e.g., including natural language queries) are provided as inputs to the source machine learning model, the source machine learning model outputs translations of the text inputs into database queries in a particular syntax, and the outputs from the source machine learning model are used in conjunction with the text inputs to train the target machine learning model. In some cases, expert feedback with respect to at least a subset of the outputs from the source machine learning model is also used in the process of training the target machine learning model.

In a hybrid stage, such as when the target machine learning model has been at least partially trained based on the source machine learning model, some text inputs are provided to the source machine learning model and other text inputs are provided to the target machine learning model. For example, text input determined to be similar to text inputs that have previously been used to train the target machine learning model may be provided to the target machine learning model, while text inputs that are determined not to be similar to any text inputs that have previously been used to train the target machine learning model may be provided to the source machine learning model. Similarity between text inputs may be determined, for example, based on cosine similarity between vector representations (e.g., "embeddings") of the text inputs.

In a mature stage, such as once the target machine learning model has been substantially trained (e.g., which may be determined based on a calculated accuracy of the target machine learning model and/or based on some other condition), all text inputs may be provided to the target machine learning model. For example, the source machine learning model may no longer be used during the mature stage.

Embodiments of the present disclosure provide multiple improvements over existing techniques for data retrieval. For example, by allowing users to provide natural language queries and translating these natural language queries into an applicable database syntax in a resource-efficient and accurate manner on the backend, techniques described herein allow users to make better use of the large amounts of data stored in association with software applications by giving users the ability to access more and different types of data than could be requested through template-based retrieval techniques and without requiring the users to compose queries in a database-specific syntax. Furthermore, by making use of a pre-trained source machine learning model as a teacher model, embodiments of the present disclosure allow a target machine learning model to be trained without the costly and time-consuming process of generating a large set of training data specifically for the target machine learning model. Furthermore, training and using the target machine learning model based on the pre-trained source machine learning model according to techniques described herein may significantly reduce the utilization of computing resources that would otherwise be required to train from scratch and use a machine learning model of similar accuracy and utility. The target machine learning model may further be trained in a manner that is more specific to the target domain in which the target machine learning model is to be used, thereby providing more targeted and accurate results for that target domain. For example, in addition to the training based on the source machine learning model, the target machine learning model may be trained based on training data (e.g., potentially a small amount) specific to the target domain such that the target machine learning model gains the benefits of the large amount of training data used to train the source machine learning model while also being honed for domain-specific performance.

The smaller resource utilization required by the target machine learning model may allow it to be deployed in contexts where the source machine learning model could not otherwise be deployed due to resource limitations. For example, the target machine learning model may be deployed on edge devices in a network, providing the functionality and accuracy of the source machine learning model without the large amount of computing resource utilization that would make the source machine learning model inappropriate for an edge device, such as due to the resource limitations of such devices.

It is noted that operations described herein, such as with respect to FIGS. 1-4 may be performed by one or more software applications running on one or more physical computing devices having one or more processors and one or more storage devices.

FIG. 1 is a block diagram 100 of example stages related to training a machine learning model for improved data retrieval according to embodiments of the present disclosure.

Source machine learning model 110 generally represents a large, pre-trained machine learning model that has been trained based on a large training data set to output database (DB) queries in response to natural language text inputs. For example, source machine learning model 110 may be provided by a third party, may be a "black box" such that internal logic is not accessible, and/or may have been trained by a large training data set that is not specific to a domain (e.g., specific database or databases) for which target machine learning model 120 is to be used. Source machine learning model 110 may be a large-scale autoregressive language model that aims to emulate a human's abilities of learning and solving problems based on brief directives and a few demonstrations, which may be referred to as few-shot learning. In one example, source machine learning model 110 is a transformer model with a large number (e.g., billions) of parameters and is trained over a large training data set (e.g., including many terabytes of data), such as obtained based on crawling of the Internet and manual review/labeling, having a large amount of cost in time, resources, and money. Source machine learning model 110 may have been fine-tuned against the source code of a large number (e.g., millions) of software repositories and/or databases. In some embodiments, source machine learning model 110 is provided to the public as a black box model through a paid service. As such, using source machine learning model 110 may involve significant cost in computing resources and/or money.

Target machine learning model 120 generally represents a smaller machine learning model that is trained for a more particular purpose, such as for a particular domain (e.g., database or databases), is more resource-efficient, and has accessible internal logic. In one example, target machine learning model 120 is a sequence-to-sequence model in which natural language text, along with a database schema, is encoded, such as utilizing transformer-based language models, and decoded using one or more long short-term memory (LSTM) layers into a logical form (e.g., into a database query). For example, target machine learning model 120 may comprise a Bidirectional Encoder Representations from Transformer (BERT) transformer, and may involve concatenation of a natural language question, a serialization of the database schema, and particular anchor texts or values from the database that bridge the elements in the natural language question to values in the database. In some embodiments, target machine learning model 120 has significantly fewer parameters than source machine learning model 110, and consumes significantly fewer physical computing resources during both training and inference than source machine learning model 110. It is noted that the particular types of models described herein with respect to source machine learning model 110 and target machine learning model 120 are included as examples, and other types of models may additionally and/or alternatively be used. Any particular architectures of source machine learning model 110 and target machine learning model 120 described herein are included as examples, and other architectures may be used without departing from the scope of the present disclosure.

Machine learning techniques generally involve using a set of training inputs and training outputs to build a model that will output a value in response to inputs. Inputs may be described as "features". For example, each training data instance may include training data inputs or features (e.g., based on natural language text) associated with a training data output or label (e.g., a database query into which the natural language text was translated). A plurality of training data instances is used to train a model, such as by constructing a model that represents relationships between features and output values. In some embodiments, training involves providing training data inputs to the model and iteratively adjusting parameters of the model until the outputs from the model in response to the training data inputs match (or fall within a certain range of) the training data outputs associated with the training data inputs, or until a certain number of iterations have been completed without significant improvements in accuracy. In some embodiments, training involves iteratively adjusting parameters of the model based on optimizing a function such as a cost function or loss function.

Various types of machine learning models known in the art may be utilized with embodiments of the present disclosure, such as a neural network, a transformer, a decision tree, a random forest, a long short term memory (LSTM) model, a gradient boosting machine, a linear regression model, and/or the like.

According to embodiments of the present disclosure, source machine learning model 110, which has been pre-trained, is used as a teacher model to train target machine learning model 120 as a student model. For example, source machine learning model 110 may be only or primarily used to translate "live" text data (e.g., received from users) into DB queries, with target machine learning model 120 being trained in the process, until target machine learning model 120 is sufficiently trained.

During an initial stage 102, all text 112 inputs are provided to source machine learning model 110 to generate DB queries 114, and target machine learning model 120 is trained based on the text 112 provided to source machine learning model 110 and the DB queries 114 output by source machine learning model 110. For example, each time text 112 is provided to source machine learning model 110 and source machine learning model 110 outputs a DB query 114 in response, a new training data instance for target machine learning model 120 may be created, such as including the text 112 associated with a label indicating the DB query 114. In some embodiments, at least a subset of the DB queries 114 output by source machine learning model 110 are manually reviewed, such as by an expert, to confirm accuracy. In one example, all DB queries 114 that are output from source machine learning model 110 with a confidence score that is below a threshold are manually reviewed before being used to generate training data. For example, source machine learning model 110 may output a confidence score with each DB query 114 that indicates a level of confidence that the DB query 114 is accurate.

Target machine learning model 120 is trained based on the training data generated from use of source machine learning model 110. Training may be performed incrementally with each new training data instance and/or in batches, such as each time a threshold amount of new training data has been generated or each time a periodic threshold has been met.

Over time, target machine learning model 120 becomes sufficiently trained to handle at least a subset of new text inputs. Thus, during a hybrid stage 104, a switcher 130 is used to determine whether each new instance of text 122 should be provided to source machine learning model 110 or to target machine learning model 120. For example, hybrid stage 104 may begin after a threshold amount of training data has been used to train target machine learning model 120, when a calculated accuracy of target machine learning model 120 exceeds a threshold, after initial stage 102 has been in progress for a threshold amount of time, and/or after one or more other conditions are met.

In some embodiments, switcher 130 decides which model to use for a given instance of text 122 based on one or more attributes of the given instance of text 122. For example, switcher 130 may compare the given instance of text 122 to previous text that has been used to train target machine learning model 120 (e.g., text included in training data). If the given instance of text 122 is similar to text that was previously used to train target machine learning model 120 then switcher 130 may determine to provide the given instance of text 122 to target machine learning model 120. However, if the given instance of text 122 is not similar to text that was previously used to train target machine learning model 120 then switcher 130 may determine to provide the given instance of text 122 to source machine learning model 110. Text may be compared, for example, using vector representations (e.g., embeddings) of the text. In certain embodiments, an embedding of each instance of text that is used to train the model (e.g., with an associated DB query label) is generated, such as using an embedding model and/or one or more other embedding techniques. An embedding model may be a neural network, and may learn a representation (embedding) for a text string through a training process that trains the neural network based on a data set, such as a plurality of text strings. An embedding may represent the meaning of a text string. In one example, the embedding model comprises a Bidirectional Encoder Representations from Transformer (BERT) model, which involves the use of masked language modeling to determine text embeddings. In other embodiments, the embedding model may involve embedding techniques such as Word2Vec and GloVe embeddings. For example, an embedding of a given instance of text 122 may be generated and compared to embeddings of instances of text that have been used to train the model. Comparison may involve determining a distance between two embeddings, such as a cosine distance. Two embeddings may be determined to be similar if the distance between the two vectors is below a threshold. It is noted that embeddings are included as one example of how text can be compared, and other techniques are possible. For example, text may be compared using other similarity measures such as Levenshtein or edit distance, and two instances of text may be determined to be similar if the Levenshtein or edit distance between the two instances of text is below a threshold.

If switcher 130 determines to provide a given instance of text 122 to source machine learning model 110, the given instance of text 122 and the DB query 124 output by source machine learning model 110 in response may be used to train target machine learning model 120. If switcher 130 determines to provide a given instance of text 122 to target machine learning model 120, then target machine learning model 120 will output a DB query 124 and source machine learning model 110 does not need to be used.

It is noted that during initial stage 102 and hybrid stage 104, the inputs to and outputs from source machine learning model 110 are used to train target machine learning model 120 online and/or offline. Online training requires that the inputs and outputs of source machine learning model 110 are directly fed to target machine learning model 120 as training data without any validation and error correction by domain experts. Offline training, conversely, requires validation and error by a domain expert. In principle, when the predictions from source machine learning model 110 are highly accurate, such as having an accuracy or confidence above a threshold (e.g., 90%), online training is preferable. Otherwise, offline training may be used. Hybrid stage 104 is designed to deal with the situation in which target machine learning model 120 learns slowly, and the users' utterances exhibit 'long tail' patterns. In this case, given a new utterance, the switcher 130 decides if a similar utterance has been processed before or is familiar to the system. If the new utterance is familiar, the utterance goes to target machine learning model 120. Otherwise, the utterance goes to source machine learning model 110. However, if target machine learning model 120 can learn fast and/or the users' utterances are evenly distributed, hybrid stage 104 can optionally be skipped. Generally, if recurrent user questions occur on a regular basis, the translation engine should switch from initial stage 102 to hybrid stage 104. Furthermore, when target machine learning model 120 achieves the same or better prediction accuracy than source machine learning model 110, the translation engine should enter mature phase 106.

As target machine learning model 120 becomes fully trained, hybrid stage 104 can end and a mature stage 106 can begin. For example, mature stage 106 may begin after a threshold amount of training data has been used to train target machine learning model 120 (e.g., a higher threshold than that used to determine when hybrid stage 104 can begin), when a calculated accuracy of target machine learning model 120 exceeds a threshold (e.g., a higher threshold than that used to determine when hybrid stage 104 can begin), after hybrid stage 104 has been in progress for a threshold amount of time, and/or after one or more other conditions are met. Accuracy of target machine learning model 120 may determined based, for example, on how closely DB queries output from target machine learning model 120 for certain text inputs correspond to known DB queries for those text inputs (e.g., in training data or test data, and/or based on manual review of DB queries output by target machine learning model 120).

During mature stage 106, all text 132 is provided to target machine learning model 120, and target machine learning model 120 outputs DB queries 134 for the input text 132. Source machine learning model 110 no longer needs to be used at all during mature stage 106, and can be uninstalled, archived, or otherwise removed from the computing system(s) on which text-to-DB-query translation is performed.

It is noted that target machine learning model 120 may also be trained based on training data (e.g., a relatively small set of training data) specific to the domain (e.g., database or databases) for which it is to be used. For example, such additional training may be performed before, during, and/or after target machine learning model 120 is trained based on source machine learning model 110 as described with respect to initial stage 102 and hybrid stage 104. For example, a training data set including text strings and labels indicating DB queries that are based on manual input specific to the domain may be generated and used to train target machine learning model 120. However, because target machine learning model 120 is trained based on source machine learning model 110, the amount of domain-specific training data generated for target machine learning model 120 does not need to be large.

Target machine learning model 120 generally utilizes a smaller amount of physical computing resources (e.g., processing and storage resources) than source machine learning model 110, such as due its relatively lightweight training process. Furthermore, target machine learning model 120 is trained in a more targeted manner for a particular domain, and so may have a higher accuracy for that particular domain than source machine learning model 110. Additionally, target machine learning model 120 is not a black box, and its internal logic is accessible, such as for explainability and auditing purposes. Thus, DB queries generated using target machine learning model 120 can be better understood than those generated using source machine learning model 110. For instance, the logic used by target machine learning model 120 to determine a particular DB query can be traced and provided to a user in order to explain how the DB query was generated, can be used to demonstrate compliance with regulations, can be used to troubleshoot the model, and/or for other useful purposes.

Text 112, 122, and 132 may represent natural language queries input by a user, such as to a chat interface. In some embodiments, in addition to text 112, 122, or 132, one or more additional inputs are provided to source machine learning model 110 and/or target machine learning model 120. For example, information related to the database for which a query is to be generated may also be provided as input data. In one example, information identifying a type and/or schema of the database is provided as model input both during training of source machine learning model 110 and/or target machine learning model 120 and when using the trained model(s). The model(s) may use this database information to determine a syntax for the DB queries that it outputs based on the input text.

DB queries 114, 124, and 134 output by source machine learning model 110 or target machine learning model 120 are provided to the database(s) for which they are intended, such as to retrieve particular information from the databases that relates to the natural language queries. For example, DB queries 114, 124, and 134 may be structured query language (SQL) queries. The retrieved information from the database(s) is then provided in response to text 112, 122, and 132, such as in the form of a natural language response to a requesting user. Thus, techniques described herein allow users to request information from databases using natural language without needing to understand or create DB queries having particular syntax that corresponds to applicable databases. As such, embodiments of the present disclosure allow the large amounts of data stored in association with computing applications to be more effectively and efficiently utilized.

Figure 2:
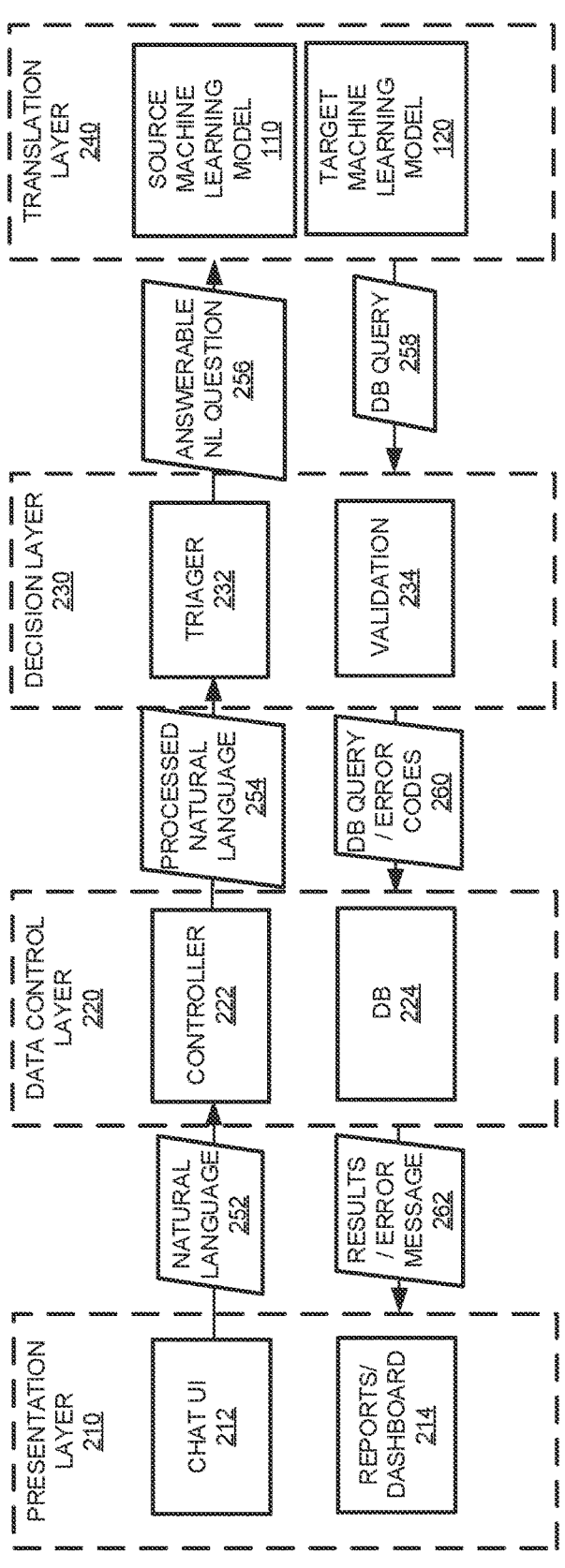
FIG. 2 is an illustration of an example architecture of a system for improved data retrieval according to embodiments of the present disclosure.

FIG. 2 is an illustration 200 of an example architecture of a system for improved data retrieval according to embodiments of the present disclosure. For example, the architecture depicted in illustration 200 may be used during stages 102, 104, and 106 of FIG. 1. In particular, translation layer 240 involves the use of source machine learning model 110 and target machine learning model 120 of FIG. 1. It is noted that the architecture shown in illustration 200 is included as an example, and other architectures may be used.

A presentation layer 210 generally corresponds to one or more user interfaces by which one or more users request and receive information. Presentation layer 210 comprises, for example, a chat user interface (UI) 212 (e.g., by which a user may interact with a chat bot through natural language queries and receive responses, such as based on information retrieved from databases based on natural language queries) and a reports/dashboard interface 214 (e.g., by which retrieved information, error reports, model explainability information, model auditing information, and/or other types of information may be provided to a user).

In an example, a user provides input via chat UI 212 in the form of a natural language query relating to particular information that is to be requested from one or more databases. For instance, the user may ask "how many host computers are currently active across all of our data centers?" The user may, for example, be an administrator of a computing environment for a business that operates multiple software defined data centers.

Natural language 252 is provided from chat UI 212 in presentation layer 210 to a controller 222 of data control layer 220. Data control layer 220 generally performs orchestration functions and executes DB queries that are eventually generated based on natural language queries, such as providing such DB queries to DB 224. In some embodiments, controller 222 performs simple pre-processing on natural language 252, such as to remove text that is not related to a potential DB query, which may be determined based on heuristic analysis of natural language 252. In one particular example, controller 222 filters out all single-word or single-token utterances so that additional processing is not performed for such utterances (e.g., because such utterances are highly unlikely to translate into a DB query). In some cases, pre-processing involves tokenizing natural language 252, where each token may represent a single word, sequence of words, sequence of characters (e.g., a sequence of characters that are not separated by whitespace, punctuation, or some other delimiter that distinguishes between discrete strings of text in the document), and/or the like.

Processed natural language 254 is provided by controller 222 in data control layer 220 to triager 232 in decision layer 230. Decision layer 230 generally performs error handling and mitigation, both before and after the involvement of machine learning models for translation of text into DB queries. Triager 232 generally predicts whether an utterance can be resolved into a DB query, classifies an unresolvable utterance into one or more categories (e.g., ambiguous utterances, small talk, filler words, improper, requiring external knowledge, non-DB-related, and/or the like), and triages utterances accordingly. For example, in a chat bot, the natural language input is generally unbounded, and only a subset of all possible utterances are appropriate as inputs to a text-to-DB-query model. Triager 232 may use machine learning techniques to classify utterances as answerable or unanswerable and, if unanswerable into different categories of unanswerable utterances. In one example, triager 232 involves the use of a deep neural network such as a Robustly Optimized BERT Approach (ROBERTa) model. ROBERTa is a variant of the BERT model, and is a transformer-based language model that uses self-attention to process input sequences and generate contextualized representations of words in a sentence. Triager 232 ensures some measure of integrity for inputs that are processed by translation layer 240, such as avoiding processing unanswerable utterances by translation layer 240. For example, triager 232 may determine not to send unanswerable utterances to translation layer 240, and may instead return an error to data control layer 220 in such cases. For instance an error (e.g., an error code 260 and/or additional error information) returned by decision layer 230 to data control layer 220 may indicate a reason why the natural language utterance could not be translated into a DB query (e.g., an indication that the natural language utterance was classified as unanswerable and, in some embodiments, which type of unanswerable utterance it was determined to be). Controller 222 in such embodiments may receive the error and provide an error message 262 to presentation layer 210 indicating the reason for the error, such as for display to the user via chat UI 212 and/or reports/dashboard 214.

When triager 232 determines that a given utterance is answerable, triager 232 provides the answerable natural language question 256 to translation layer 240. Translation layer 240 uses source machine learning model 110 and/or target machine learning model 120 to translate the answerable natural language question 256 into a DB query 258. For example, translation layer 240 may employ techniques described above with respect to initial stage 102, hybrid stage 104, and/or mature stage 106 to translate answerable natural language question 256 into DB query 258. In some embodiments, the logic of translation layer 240 is abstracted from other layers (e.g., decision layer 230), such that other components (e.g., decision layer 230) can submit natural language to translation layer 240 for translation into DB queries without the need to be aware of how the translation is performed or which model(s) are used. Thus, decision layer 230 may be unaware of whether initial stage 102, hybrid stage 104, or mature stage 106 is in progress. While not shown, information about the DB against which the DB query is to be executed (e.g., DB schema information for DB 224) may also be provided to translation layer 240, and the DB information may also be provided to the model(s) used for translation.

DB query 258 is returned by translation layer 240 to decision layer 230 in response to answerable natural language question 256. DB query 258 is a query in a particular syntax of an applicable DB, such as DB 224. In some embodiments, validation 234 is performed on DB query 258 by decision layer 230. Validation 234 generally involves checking the validity of a format of DB query 258, such as detecting syntax and/or semantic errors (e.g., mismatched column and table names). In some embodiments, validation 234 is based on rules and/or information (e.g., schema information) related to the specific DB against which the DB query is to be executed. Some errors detected during validation 234 (e.g., mismatched column and table names) may be rectified through human intervention, and so a domain expert may be notified for a quick resolution. In other cases, errors detected during validation 234 are more extensive, and an error is simply returned. In some cases all errors, whether they can be rectified or not, are provided to data control layer 220 (e.g., in the form of error codes 260 and/or additional error information), and data control layer 220 may return an error message 262 to presentation layer 210 accordingly.

If DB query 258 successfully passes validation 234 (or if any errors identified during validation 234 are rectified, such as through human intervention), decision layer 230 returns DB query 260 to data control layer 220. DB query 260 may be the same as DB query 258 or may be a modified version of DB query 258 wherein one or more errors have been recitified. When DB query 260 is received at data control later 220, controller 222 may execute DB query 260, such as with respect to DB 224. For example, DB 224 may be a SQL DB and DB query 260 may be a SQL query that is executed in order to retrieve requested data from DB 224. SQL is included as an example, and other types of DBs and queries are possible. If execution of DB query 260 fails, then data control layer 220 may return an error message 262 to presentation layer 210. If execution of DB query is successful, such as resulting in retrieval of requested data from DB 224, then the results of executing the query are returned to presentation layer 210 in the form of results 262 (e.g., including the requested data). In the example above in which natural language 252 includes the question "how many host computers are currently active across all of our data centers?," the retrieved data included in results 262 may comprise a total number of active hosts in all data centers associated with the user's business, which may have been stored in one or more tables of DB 224.

Results and/or error message 262 are used to provide output to the user via chat UI 212 and/or reports/dashboard 214. For example, the retrieved data may be used to generate a natural language response to the user (e.g., "there are 42 active host computers across all your data centers"), which may be displayed within chat UI 212. The retrieved data may also be displayed in a report or dashboard 214. Furthermore, if an error message 262 is returned, the user may be provided with a natural language response via chat UI 212 indicating the error (e.g., "unfortunately, we were unable to retrieve the information you requested because it is not available" or "please submit a more detailed request") and/or the error message 262 may be displayed in a report or dashboard 214.

Figure 3:
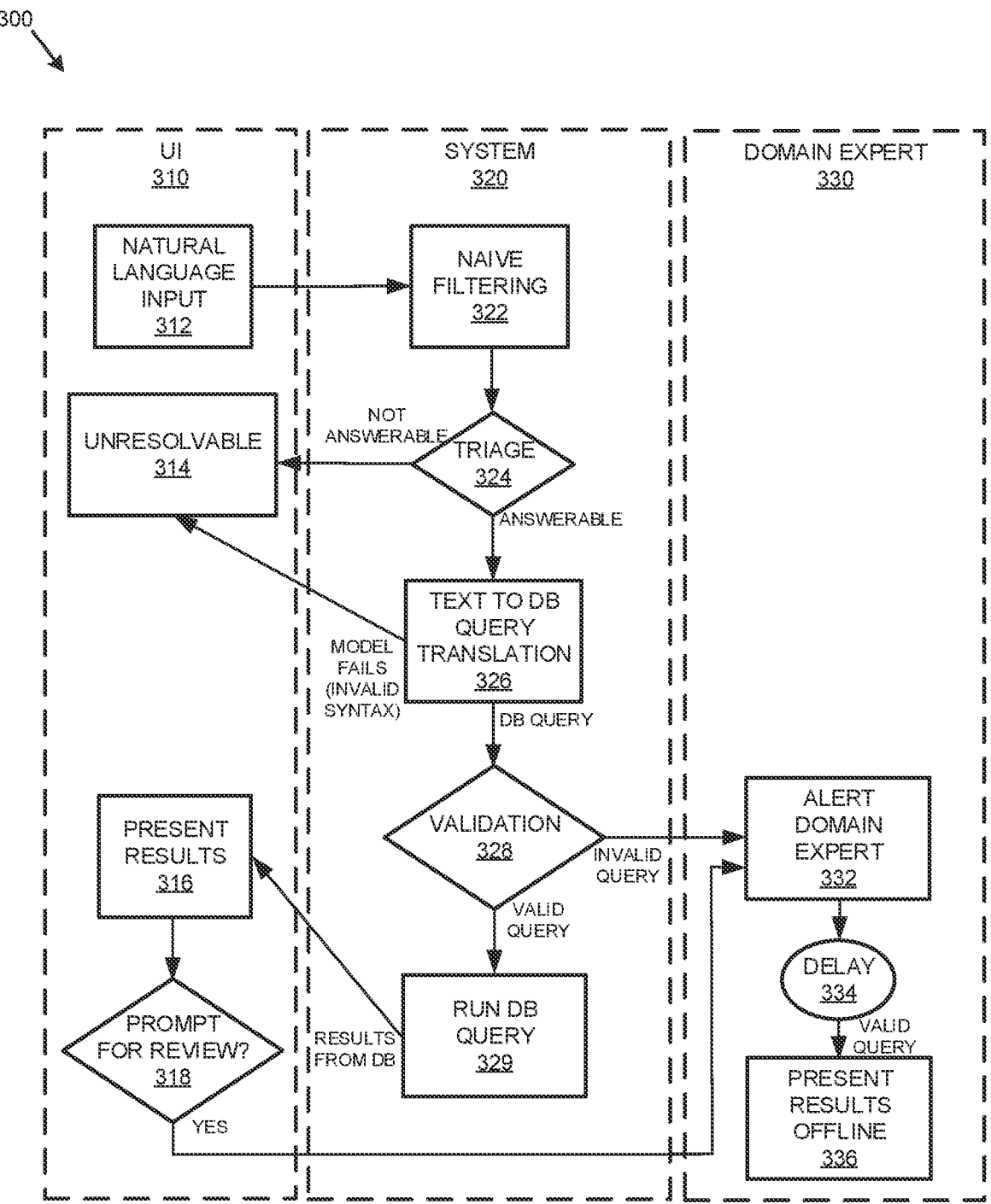
FIG. 3 is an illustration of a workflow relating to a system for improved data retrieval according to embodiments of the present disclosure.

FIG. 3 is an illustration 300 of a workflow relating to a system for improved data retrieval according to embodiments of the present disclosure. UI 310 generally corresponds to presentation layer 210 of FIG. 2, system 320 generally corresponds to data control layer 220, decision layer 230, and translation layer 240 of FIG. 2, and domain expert 330 generally refers to the involvement of a human expert in an applicable domain (e.g., an administrator of a particular database from which data is to be retrieved).

At step 312, natural language input is received at UI 310. At step 322, naive filtering is performed by system 320 with respect to the natural language input (e.g., filtering out single-word or single-token utterances and/or other utterances that do not meet basic conditions for being processed further). AT step 324, triaging is performed with respect to the natural language input, such as corresponding to triager 232 of FIG. 2. If the natural language input is determined not to be answerable, then a response is provided via UI 310 at step 314 indicating that the natural language input is unresolvable. If the natural language input is determined to be answerable, then text to DB query translation is performed at step 326 (e.g., corresponding to translation layer 240 of FIG. 2). If an error occurs with respect to translation, such as a failure of a machine learning model and/or invalid syntax being generated, then a response is provided via UI 310 at step 314 indicating that the natural language input is unresolvable.

If translation is successful, then validation is performed at step 328 for the generated DB query. Validation at step 328 may correspond to validation 234 of FIG. 2. If the query is determined to be invalid, then a domain expert may be alerted at step 332 (e.g., with respect to domain expert 330). Involvement of a domain expert may involve a delay 334, and results of the query may need to presented offline at step 336. For example, once the domain expert is able to review and correct an invalid DB query, the corrected DB query may be executed against the DB, and the results may be provided via UI 310 when they are retrieved (e.g., which may not be in real-time with respect to the user's interaction with UI 310, and may therefore be considered "offline"). Alternatively, if the domain expert is able to correct the DB query quickly, the DB query may be run and the results may be provided to the user with only a small delay.

A valid query is run at step 329. For example, the valid query may be executed against an applicable DB. The results from the DB are then provided to UI 310 and presented to the user at step 316. The user may be prompted at step 318 to provide input indicating whether the results should be reviewed. For example, if the results are problematic or do not match what the user requested, the user may ask for review. If the user requests review, then the domain expert may be alerted at step 332, leading to a delay 334 and potential presentation of results offline at step 336 (e.g., after the domain expert has reviewed and corrected the query as appropriate in order to retrieve the correct results).

In some embodiments, the application will batch a series of utterances, DB queries, and/or execution results for presentation to domain expert 330 for review. The domain expert may review and modify the DB queries if needed, and may execute the corrected queries and provide the results via a secure offline system, such via an email or instant messaging application. The corrected DB queries (e.g., modified by the domain expert) may also be stored as labels in association with the corresponding natural language utterances for use in retraining target machine learning model 120 of FIGS. 1 and 2. Thus, the model may be continuously improved in a feedback loop involving manual input from a domain expert.

FIG. 4 depicts example operations 400 related to training a machine learning model for improved data retrieval according to embodiments of the present disclosure. For example, operations 400 may be performed by one or more software components running on one or more physical computing devices, and may correspond to certain aspects described above with respect to FIGS. 1-3.

Operations 400 begin at step 410, with receiving text comprising a natural language request.

Operations 400 continue at step 420, with providing one or more inputs to a source machine learning model based on the text, wherein the source machine learning model has been trained using source training data corresponding to a plurality of databases.

In certain embodiments, the source machine learning model was trained by a third party, and wherein internal logic of the source machine learning model is not available for analysis with respect to the database query received from the source machine learning model.

Operations 400 continue at step 430, with receiving, from the source machine learning model in response to the one or more inputs, a database query in a syntax corresponding to a target database.

Operations 400 continue at step 440, with generating training data for a target machine learning model based on the text and the database query received from the source machine learning model, wherein the target machine learning model has been trained using a smaller amount of training data than the source training data that was used to train the source machine learning model. In some embodiments, the target machine learning model has fewer parameters than the source machine learning model.

In certain embodiments, respective internal logic of the target machine learning model is available for analysis. In some embodiments, the source machine learning model utilizes a larger amount of physical computing resources than the target machine learning model.

In certain embodiments, the generating of the training data is further based on user feedback with respect to the database query received from the source machine learning model.

Operations 400 continue at step 450, with training the target machine learning model based on the training data.

In some embodiments, the target machine learning model is used to determine a new query in the syntax corresponding to the target database based on new text comprising a new natural language request.

Certain embodiments further comprise determining whether to use the source machine learning model or the target machine learning model for subsequently-received text based on a comparison of the subsequently-received text with the text. For example, the comparison may be based on generating embeddings of the subsequently-received text and the text. Some embodiments further comprise determining whether to stop using the source machine learning model based on a determined accuracy of the target machine learning model.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of training a machine learning model, the method comprising:

receiving a first input text comprising a first natural language request;

providing one or more inputs to a source machine learning model based on the first input text, wherein the source machine learning model has been trained using source training data corresponding to a plurality of databases;

receiving, from the source machine learning model in response to the one or more inputs, a first database query in a syntax corresponding to a target database;

generating training data for a target machine learning model based on the first input text and the first database query received from the source machine learning model, wherein the target machine learning model has been trained using a smaller amount of training data than the source training data that was used to train the source machine learning model;

training the target machine learning model based on the training data;

receiving a second input text comprising a second natural language request;

determining, based on one or more attributes of the second input text, whether to provide the second input text to the source machine learning model or the target machine learning model;

providing the second input text to one of: the source machine learning model or the target machine learning model based on the determining;

receiving, in response to providing the second input text, a second database query from either the source machine learning model or the target machine learning model; and executing the second database query against the target database.

2. The method of claim 1, wherein the generating of the training data is further based on user feedback with respect to the first database query received from the source machine learning model.

3. The method of claim 1, wherein the target machine learning model is used to determine the second database query in a syntax corresponding to the target database based on the second input text comprising the second natural language request.

4. The method of claim 1, wherein the source machine learning model was trained by a third party, and wherein internal logic of the source machine learning model is not available for analysis with respect to the first database query received from the source machine learning model.

5. The method of claim 4, wherein respective internal logic of the target machine learning model is available for analysis.

6. The method of claim 1, wherein the source machine learning model utilizes a larger amount of physical computing resources than the target machine learning model.

7. The method of claim 6, wherein determining, based on one or more attributes of the second input text, whether to provide the second input text to the source machine learning model or the target machine learning model is based on a comparison of the second input text with the first input text.

8. The method of claim 7, wherein the comparison is based on generating embeddings of the first input text and the second input text.

9. The method of claim 1, further comprising determining whether to stop using the source machine learning model based on a determined accuracy of the target machine learning model.

10. A system for training a machine learning model, comprising:

at least one memory; and at least one processor coupled to the at least one memory, the at least one processor and the at least one memory configured to:

receive a first input text comprising a first natural language request;

provide one or more inputs to a source machine learning model based on the first input text, wherein the source machine learning model has been trained using source training data corresponding to a plurality of databases;

receive, from the source machine learning model in response to the one or more inputs, a first database query in a syntax corresponding to a target database;

generate training data for a target machine learning model based on the first input text and the first database query received from the source machine learning model, wherein the target machine learning model has been trained using a smaller amount of training data than the source training data that was used to train the source machine learning model;

train the target machine learning model based on the training data;

receive a second input text comprising a second natural language request;

determine, based on one or more attributes of the second input text, whether to provide the second input text to the source machine learning model or the target machine learning model;

provide the second input text to one of: the source machine learning model or the target machine learning model based on the determining;

receive, in response to providing the second input text, a second database query from either the source machine learning model or the target machine learning model; and execute the second database query against the target database.

11. The system of claim 10, wherein the generating of the training data is further based on user feedback with respect to the first database query received from the source machine learning model.

12. The system of claim 10, wherein the target machine learning model is used to determine the second database query in a syntax corresponding to the target database based on the second input text comprising the second natural language request.

13. The system of claim 10, wherein the source machine learning model was trained by a third party, and wherein internal logic of the source machine learning model is not available for analysis with respect to the first database query received from the source machine learning model.

14. The system of claim 13, wherein respective internal logic of the target machine learning model is available for analysis.

15. The system of claim 10, wherein the source machine learning model utilizes a larger amount of physical computing resources than the target machine learning model.

16. The system of claim 15, wherein determining, based on one or more attributes of the second input text, whether to provide the second input text to the source machine learning model or the target machine learning model is based on a comparison of the second input text with the first input text.

17. The system of claim 16, wherein the comparison is based on generating embeddings of the first input text and the second input text.

18. The system of claim 10, wherein the at least one processor and the at least one memory are further configured to determine whether to stop using the source machine learning model based on a determined accuracy of the target machine learning model.

19. A non-transitory computer readable medium storing instructions that, when executed by one or more processors, cause the one or more processors to:

receive a first input text comprising a first natural language request;

provide one or more inputs to a source machine learning model based on the first input text, wherein the source machine learning model has been trained using source training data corresponding to a plurality of databases;

receive, from the source machine learning model in response to the one or more inputs, a first database query in a syntax corresponding to a target database;

generate training data for a target machine learning model based on the first input text and the first database query received from the source machine learning model, wherein the target machine learning model has been trained using a smaller amount of training data than the source training data that was used to train the source machine learning model;

train the target machine learning model based on the training data;

receive a second input text comprising a second natural language request;

determine, based on one or more attributes of the second input text, whether to provide the second input text to the source machine learning model or the target machine learning model;

provide the second input text to one of: the source machine learning model or the target machine learning model based on the determining;

receive, in response to providing the second input text, a second database query from either the source machine learning model or the target machine learning model; and execute the second database query against the target database.

20. The non-transitory computer readable medium of claim 19, wherein the generating of the training data is further based on user feedback with respect to the first database query received from the source machine learning model.

\* \* \* \* \*